Patented May 15, 1928.

1,669,997

UNITED STATES PATENT OFFICE.

FRIEDRICH NOLL, OF BENRATH, GERMANY.

PERSALTS AND PROCESS OF MAKING THE SAME.

No Drawing. Application filed August 21, 1923, Serial No. 658,644, and in Germany August 28, 1922.

My invention relates to improvements in persalts such as sodium perborate, sodium percarbonate, and the like, and the process of making the same. As is known to those skilled in the art the compounds produced by the decomposition of hydrogen peroxid such as sodium perborate, sodium percarbonate, and the like are gradually decomposed, giving off oxygen, and when stored they are not very stable, which decomposition results in a deterioration of the product. Probably the decomposition is caused by catalytical action of minute amounts of foreign matter such as metal oxids, which are always found in the raw materials from which the said compounds are made, and efforts have been made to counteract the decomposing action of the foreign matter, by adding to the persalt certain protective substances such as magnesium silicate, magnesium chlorid, an alkali metal monosilicate, arabic gum, which substances are added either in the course of the manufacture of the salt or to the salt itself. When thus added to the salt the protective substances have an anti-catalytic action, so that the persalts are protected as against the catalytic action of the catalysts found in the preparation. The object aimed at is attained to a certain degree, the persalts containing such protective substances having an increased stability when stored as compared to the persalts having no protective substances added thereto. However, the durability of the preparation is not sufficient for practical purposes, and more particularly it has heretofore not been possible to manufacture percarbonates which answered the requirements of the trade.

I have discovered that persalts of practically unlimited durability are produced by removing the foreign matter from the raw material before causing the reaction. Practical experiments have shown that suitable precipitating media must be added to the raw material a certain length of time, say several days, before causing the reaction, because the velocity of the reaction of the precipitating media on the metal oxids is slow, said oxids probably being present in colloidal solution. When thus removing the said foreign matter from the raw material it is not necessary to incorporate protective media in the preparation.

For example, in the manufacture of sodium percarbonate I add to the $Na_2CO_3$ solution a precipitating medium before entering the same to the reaction, and I cause the precipitating medium to act on the solution a certain length of time sufficient to complete the precipitation of the foreign matter, whereupon I separate the precipitated matter in any known or preferred way for example by filtration. The filtered solution is subjected to the reaction. Preferred precipitating media are alkali-metal silicates and I have found that alkali-metal disilicates are particularly effective.

Experiments have shown that when using sodium disilicate as a precipitating medium, the loss of oxygen in sodium percarbonate containing 12 percent of oxygen was not more than 0.2 percent in two months and a half, and that after another month the compound was found to be stable, and when using sodium monosilicate as a precipitating medium a salt containing 11.00 percent of oxygen showed a loss of 1.4 percent of oxygen after two months and a half, and at the end of another month the loss was 0.2 percent.

*Example 1.*—In the manufacture of sodium perborate I proceed as follows: 43 kilogrammes of borax are dissolved in about 425 litres of water of from 30 to 35 degrees centigrade to which before 9.0 kilogrammes of caustic soda had been added. To the solution I add 10 kilogrammes of a 30% solution of sodium disilicate ($Na_2Si_2O_5$) while stirring the solution. The mixture is allowed to stand from two to three days at a temperature of from 30 to 35° C., whereupon the deposit is removed by filtering. The filtered solution is cooled to from 0 to 5° C., whereupon 50 kilogrammes of a 31% hydrogen peroxid ($H_2O_2$) are slowly added while stirring the solution. At the end of the reaction I separate the precipitated perborate from the mother lye by means of a centrifugal machine and I dry the same by spreading the same into a thin layer.

*Example 2.*—For manufacturing sodium percarbonate I dissolve 230 kilogrammes of calcined soda ($Na_2CO_3$) in about 425 litres of water and I heat to 35° C. Thereafter I add 10 kilogrammes of a 30% solution of sodium disilicate ($Na_2Si_2O_5$), I mix the solution by stirring, and I allow the same to stand about two or three days at a temperature of 35° C., whereupon the solution is filtered. The filtered solution is made to flow into 200 kilograms of a 30% solution of hydrogen peroxid ($H_2O_2$) while constantly stirring the solution and cooling the same to from 0 to 5° C. The percarbonate which is thus produced is separated by means of a centrifugal machine and dried in the air.

I claim:

1. The herein described process of manufacturing persalts, which consists in adding to a raw material in solution adapted to form a persalt with hydrogen peroxid a silicate adapted to precipitate foreign matter tending to set free the oxygen of the persalt and allowing the said medium to act until the foreign matter has been precipitated, and thereafter causing the reaction of the purified raw material and hydrogen peroxid.

2. The herein described process of manufacturing persalts, which consists in adding to a raw material in solution adapted to form a persalt with hydrogen peroxid an alkali-metal silicate adapted to precipitate foreign matter tending to set free the oxygen of the persalt and allowing the said medium to act until the foreign matter has been precipitated and thereafter causing the reaction of the purified raw material and hydrogen peroxid.

3. The herein described process of manufacturing persalts, which consists in adding to a raw material in solution adapted to form a persalt with hydrogen peroxid an alkali-metal disilicate adapted to precipitate foreign matter tending to set free the oxygen of the persalt and allowing the said medium to act until the foreign matter has been precipitated, and thereafter causing the reaction of the purified raw material and hydrogen peroxid.

4. The herein described process of manufacturing percarbonates which comprises adding to a raw carbonate a silicate adapted to precipitate foreign matter tending to free the oxygen of the percarbonate and allowing said silicate to act until the foreign matter has been precipitated and thereafter reacting the purified carbonate with hydrogen peroxide.

5. The herein described process of manufacturing percarbonates which comprises adding to raw carbonate an alkali-metal silicate adapted to precipitate the oxygen of the percarbonate and allow said alkali-metal silicate to act until the foreign matter has been precipitated and thereafter reacting the purified carbonate with hydrogen peroxide.

6. The herein described process of manufacturing percarbonates which comprises adding to a solution of raw carbonate alkali-metal disilicate adapted to precipitate foreign matter tending to set free the oxygen of the percarbonate and allowing said alkali-metal disilicate to act until the foreign matter has been precipitated, and thereafter reacting the purified carbonate with hydrogen peroxide.

7. As an article of manufacture, a stable percarbonate free from non-alkali-metal silicates and free from iron compounds.

8. As an article of manufacture, a stable sodium percarbonate free from non-alkali-metal silicates and free from iron compounds.

In testimony whereof I affix my signature.

Dr. FRIEDRICH NOLL.